United States Patent [19]
Freund

[11] Patent Number: 5,692,878
[45] Date of Patent: Dec. 2, 1997

[54] APPARATUS FOR REMOVING PLATE-SHAPED OBJECTS FROM A STACK

[76] Inventor: Michael Freund, Kodak Aktiengesellschaft, 70323 Stuttgart, Germany

[21] Appl. No.: 748,732

[22] Filed: Nov. 18, 1996

[30] Foreign Application Priority Data

Nov. 23, 1995 [DE] Germany .................. 295 18 578 U

[51] Int. Cl.$^6$ .................................................... B65G 59/02
[52] U.S. Cl. ................................ 414/796.6; 414/796.7; 414/796.8; 414/796.9; 414/908
[58] Field of Search ...................... 414/796.6, 796.7, 414/796.8, 796.9, 908

[56] References Cited

U.S. PATENT DOCUMENTS

| | | | |
|---|---|---|---|
| 4,079,512 | 3/1978 | Lakes | 414/796.9 |
| 4,149,356 | 4/1979 | Palmer | 53/459 |
| 4,195,961 | 4/1980 | Waiblinger | 414/796.9 |
| 4,723,884 | 2/1988 | Brinker et al. | 414/796.9 |
| 4,735,540 | 4/1988 | Allen et al. | 414/908 |
| 4,921,397 | 5/1990 | Watanabe | 414/796.9 |
| 5,437,530 | 8/1995 | Beckmann | 414/908 |

FOREIGN PATENT DOCUMENTS

| | | | |
|---|---|---|---|
| 0067073 | 12/1982 | European Pat. Off. | |
| 4109877 | 10/1992 | Germany | 414/908 |
| 211229 | 9/1986 | Japan | 414/908 |
| 60-56275 | 3/1994 | Japan | 414/796.6 |

Primary Examiner—Karen B. Merritt
Assistant Examiner—Douglas Hess
Attorney, Agent, or Firm—Raymond L. Owens

[57] ABSTRACT

Apparatus for removing plate-shaped objects (CDs) from a stack, the apparatus having a gripper mechanism, a stack magazine with a vertically arranged shaft that passes through the central openings (O) of the plate-shaped objects of the stack, and a lifting mechanism for the stack. To achieve a compact device structure with a low physical height and secure, simple removal and handling of plate-shaped objects, such as annular disks or information media in the form of compact disks or floppy disks in an automatic environment, the shaft has at its top end an upwardly tapering region, and a mechanism for displacing plate-shaped objects (CD), lifted into this region, in the horizontal direction against the shaft are arranged in such a way that a topmost object of the stack, displaced horizontally, can be gripped by means of the gripper mechanism. In addition, the gripper mechanism and the lifting mechanism are arranged vertically displaceably alongside the stack magazine.

12 Claims, 1 Drawing Sheet

APPARATUS FOR REMOVING PLATE-SHAPED OBJECTS FROM A STACK

FIELD OF THE INVENTION

The invention concerns an apparatus for removing plate-shaped objects from a stack, the apparatus having a gripper mechanism, a stack magazine with a vertically arranged shaft that passes through the central openings of the plate-shaped objects of the stack, and a lifting mechanism for the stack.

Apparatus of the aforesaid kind, which serve to remove plate-shaped objects such as information media (compact disks, floppy disks (5.25'/13.34 cm), or records) or annular disks, are known.

BACKGROUND OF THE INVENTION

EP-B-0-067 073 discloses an apparatus for removing plate-shaped information media, in particular compact disks (CDs), from a stack, which has on the one hand a gripper mechanism arranged above the stack magazine, with a suction mechanism for gripping the CD, and on the other hand a lifting mechanism arranged below the stack magazine with lifting means acting through openings of a bottom part of the stack magazine, the apparatus being arranged in a packaging mechanism for CDs. Given the desire for a compact device with a low physical height and secure handling of the CDs in the device, this arrangement of the gripper and lifting mechanisms, and the use of a suction apparatus, is disadvantageous.

SUMMARY OF THE INVENTION

It is the object of the invention to create an apparatus of the aforesaid kind which has a low physical height and a compact configuration, and guarantees secure, easy removal and handling of plate-shaped objects in an automated environment.

This object is achieved in an apparatus for removing plate-shaped objects (CDs) having central openings from a stack, the apparatus having a gripper mechanism, a stack magazine with a vertically arranged shaft that passes through the central openings of the plate-shaped objects of the stack, and a lifting mechanism for the stack, the improvement comprising the shaft defining at its top end an upwardly tapering region; means for displacing the plate-shaped objects (CDs), lifted into this region by the lifting mechanism, in the horizontal direction against the shaft, the plate-shaped objects (CDs) being arranged in such a way that a topmost object (CD) of the stack, displaced horizontally by the displacing means, is gripped by the gripper mechanism.

The displacing means have at least one spring element by means of which a displacement force acting in the radial direction on the outer rim of the top plate-shaped objects can be produced, and the taper of the top end of the shaft is configured in the shape of a cone, such that the topmost object can be shifted with its outer rim in the horizontal direction over a predefined distance(s), with respect to the stack, that is required for grasping that object at its outer rim.

On the one hand the gripper mechanism, which has vertically movable upper and lower gripper arms for grasping the projecting outer rim of the topmost object, is arranged alongside the stack magazine movably in the vertical direction. On the other hand the lifting mechanism, which in order to lift the stack of objects has two horizontally pivotable lifting means for surrounding at least two of the lowest objects at the outer rim and at points on their outer periphery diametrically opposite one another, is arranged alongside the stack magazine.

Additional features and advantages are evident from the description of the embodiment of the invention depicted in the drawing.

DETAILED DESCRIPTION OF THE INVENTION

Figure 1:
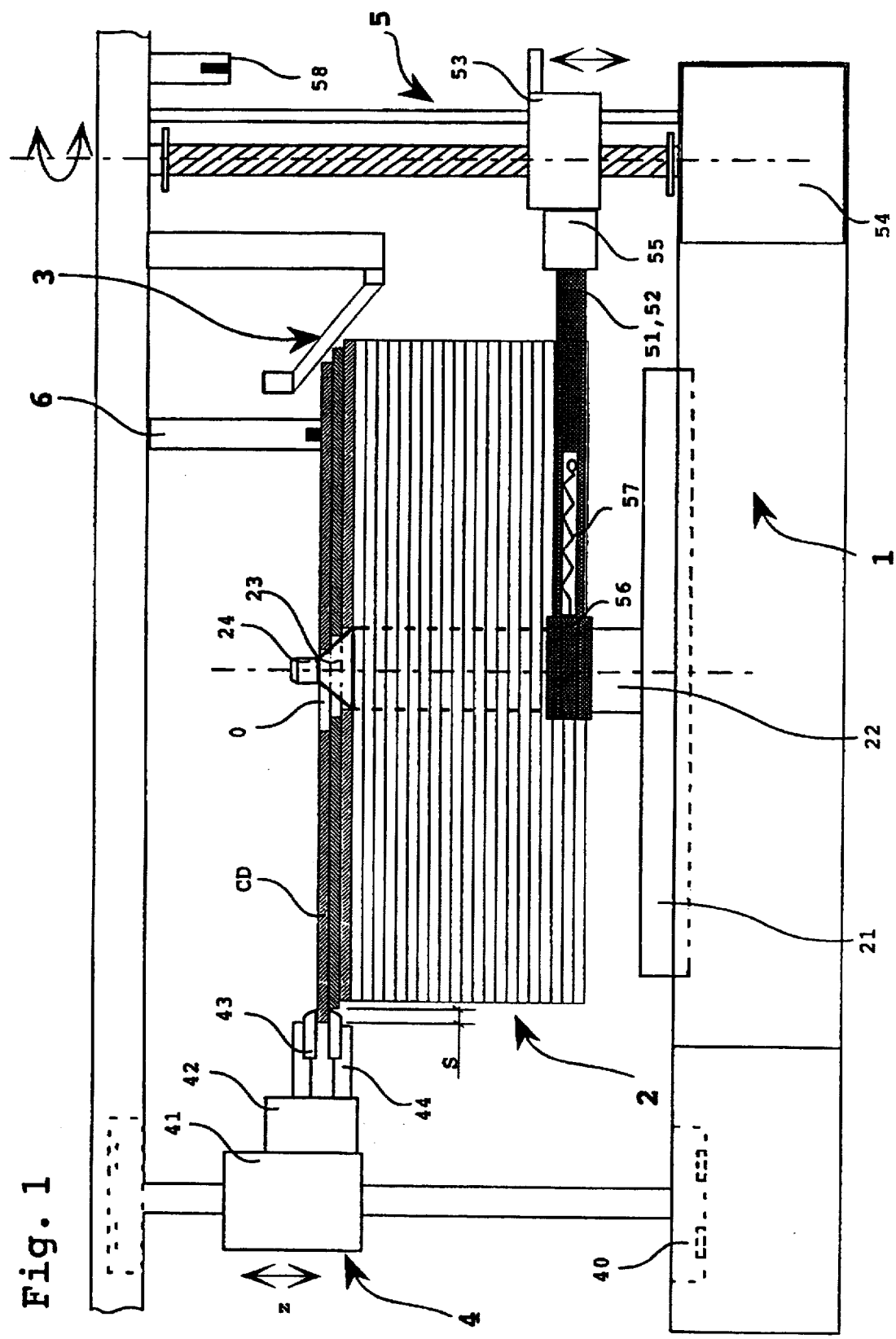
FIG. 1 shows the apparatus according to the invention in a side view, without a housing and partly in section.

The following description refers to an apparatus for removing a plate-shaped object from a stack, in which the plate-shaped object is preferably configured as an information medium in the form of a compact disk (CD). It is self-evident to a person skilled in this art that other plate-shaped objects having a central opening, such as 5.25' (13.34 cm) floppy disks or annular disks, can also be removed from a stack with the invented apparatus.

The apparatus depicted in FIG. 1 for removing plate-shaped objects, hereinafter referred to as compact disks or CDs, is shown in an operating position in which a stack of CDs has been lifted into a so-called removal position. The apparatus includes a magazine support 1, which for example is arranged in a playback/recording device (not shown) for compact disks; a stack magazine 2, replaceable in a known manner, with CDs stacked on top of one another; displacement means, configured as leaf spring 3 for CDs in an upper region of the stack magazine; a gripper mechanism 4 for gripping an individual CD; and a lifting mechanism 5 for the CD stack. In addition, a sensor mechanism 6 for detecting that a topmost CD of the stack has been lifted into a removal position is arranged in the upper part of the stack magazine.

Stack magazine 2 includes a horizontally oriented base plate 21 with a diameter slightly less than that of the compact disk (CD), and a preferably cylindrical shaft 22 in a vertical orientation, arranged in the central axis of the base plate, such that the shaft passes through the central openings of the compact disks (CDs) of the stack and thus ensures that the stack is held and aligned in the vertical direction.

Shaft 22 has at its top end an upwardly tapering region 23, this region being configured in the shape of a cone which ends at the top in a cylindrical terminating piece 24 with threads that are used for mounting a protective shroud (not depicted).

Tapering region 23 of the top end of the shaft or cone is configured so that the CDs of the stack lifted into this region can be displaced by leaf spring 3 in a horizontal direction against shaft 22 in such a way that the topmost CD of the stack can be gripped by means of gripper mechanism 4. In this context the topmost CD, because of the selected slope of the cone, can be offset with its outer rim in a horizontal direction by a predetermined distance with respect to the stack so that this CD can be grasped at its outer rim that faces away from leaf spring 3.

Leaf spring 3 for displacing at least one CD of the stack are arranged alongside stack magazine 2 and parallel to the region or extent of tapering region 23 of shaft 22; they have at least one spring element, configured as a leaf spring, by means of which a displacement force acting in a radial direction on the outer rim of the topmost CD or CDs can be produced, and a spring-loaded inclined ramp for the outer rim of the CD or CDs is formed. Leaf spring 3 is mounted in a known manner on a (schematically depicted) device wall.

To prevent displacement and for insertion of the stack magazine into the device in the correct position, magazine support 1 has a recess to receive base plate 21 of the stack magazine.

Gripper mechanism 4, which is arranged on the side facing away from leaf spring 3 and alongside the stack magazine, can be moved in a known manner in the vertical and horizontal directions by means of microprocessor-controlled X and Z drive units 40 and 41 (depicted schematically), and has upper 43 and lower 44 gripping arms, movable vertically by means of a further generally known drive unit 42, for grasping the projecting outer rim of the topmost CD of the stack.

Lifting mechanism 5, which is arranged alongside the stack magazine and in the region of leaf spring 3, has, in order to lift the stack of CDs, two horizontally pivotable lifting means 51, 52, which are provided in order to surround at least two of the lowest compact disks (CDs) at their outer rim and at diametrically opposite points of their outer periphery. Lifting means 51, 52 are arranged on a vertically movable slide 53 so that during lifting, they can be moved by means of a generally known microprocessor-controlled spindle drive unit 54 (depicted schematically) into the upper region of the stack magazine past the outside of leaf spring 3. To perform the horizontal pivoting movement of lifting means 51, 52, a generally known microprocessor-controlled eccentric drive unit 55 is installed on slide 53.

Arranged on lifting means 51, 52 of lifting mechanism 5 are clamping jaws 56 with gripping surfaces that are made of an elastic material and have V-shaped depressions or a lamellar structure on the gripping surfaces to receive the outer rim of the CDs, in such a way that the lowest CDs grasped by the lifting means of the lifting mechanism can, in the removal position at upper end of shaft 22, be displaced in the horizontal direction by means of leaf spring 3 inside or between the clamping jaws, and can be gripped by gripper mechanism 4.

In order for lifting means 51, 52 to grip the two lowest CDs of the stack, base plate 21 of stack magazine 2 has a height greater than the recess in magazine support 1, so that the lowest CD of the stack is at a distance from the top of the magazine support.

In a further embodiment of the apparatus according to the invention, on the one hand, for easier displacement of the lowest CDs held or clamped by means of lifting means 51, 52, clamping jaws 56 are arranged so as to permit displacement horizontally in the direction of gripper mechanism 4 against the spring force of spring means 57, and on the other hand the leaf spring 3 is replaced by a roller (not shown) that is spring-loaded against the topmost CD; a so-called friction roller, driven by a drive unit, which could rest on the top surface of the topmost CD of the stack in order to displace the topmost CD of the stack horizontally, could also be used.

The apparatus operates as follows:

First a stack magazine 2 fully loaded with compact disks (CDs) is placed into the recess of magazine support 1 from the side where gripper mechanism 4 is arranged. The gripper mechanism is located outside the insertion region in a transfer position (X direction) not depicted or processing station for a CD, lifting means 51, 52 of lifting mechanism 5 are located in an opened outer position in the region at the lower end of the stack, and the CD stack is located in a lowered position on the stack magazine (depicted in dashed lines), in which leaf spring 3 are not in engagement with the topmost CD of the stack.

Subsequently, in accordance with a program sequence of a control unit (not shown), drive units 54, 55 of lifting mechanism 5 are activated in such a way that first of all lifting means 51, 52 surround the two lowest CDs of the stack with their clamping jaws 56, and then the entire CD stack is lifted.

During the upward movement of the stack, the topmost CD or CDs of the stack, as soon as they enter the region of leaf spring 3, are displaced horizontally against tapering region 23 of magazine shaft 22.

As soon as the topmost CD of the stack is detected by a sensor (e.g. reflection photoelectric barrier) of sensor mechanism 6, spindle drive unit 54 of lifting mechanism 5 is stopped, and gripper mechanism 4 is moved by means of its X and Z drive units 40, 41 into a position to grip the topmost, projecting CD.

Once this position is reached, drive unit 42 for the lower and upper gripper arms 43, 44 is activated, and the topmost CD is gripped at its projecting outer rim.

Then the topmost CD is transported by means of gripper mechanism 4 to the transfer or processing station, and set down there.

This process repeats until all the CDs have been removed from stack magazine 2, and lifting mechanism 5 is in a top end position detected by means of a further sensor mechanism 58.

Lastly, gripper mechanism 4 and lifting mechanism 5 are moved into their starting positions described above, and the stack magazine can once again be changed.

The invention has been described in detail with particular reference to certain preferred embodiments thereof, but it will be understood that variations and modifications can be effected within the spirit and scope of the invention.

Parts List 1 magazine support
2 stack magazine
3 leaf spring
4 gripper mechanism
5 lifting mechanism
6 sensor mechanism
21 base plate
22 shaft
23 tapering region
24 terminating piece
40 drive unit
41 drive unit
42 drive unit
43 gripping arm
44 gripping arm
51 lifting means
52 lifting means
53 movable slide
54 drive unit
55 drive unit
56 clamping jaws
57 spring means
58 sensor mechanism

I claim:

1. Apparatus for removing plate-shaped objects (CDs) having central openings from a stack, the apparatus having a gripper mechanism, a stack magazine with a vertically arranged shaft that passes through the central openings of the plate-shaped objects of the stack, and a lifting mechanism for the stack, the improvement comprising the shaft defining at its top end an upwardly tapering region; means for displacing the plate-shaped objects (CDs), lifted into this region by the lifting mechanism, in a horizontal direction against the shaft, the plate-shaped objects (CDs) being arranged in such a way that a topmost object (CD) of the stack, displaced horizontally by the displacing means, are gripped by the gripper mechanism.

2. Apparatus according to claim 1, characterized in that the displacing means includes at least one spring element which applies a displacement force acting in a radial direction on the outer rim of the top plate-shaped object (CD).

3. Apparatus according to claim 2, characterized in that the spring element is configured as a leaf spring that is arranged alongside the stack magazine and parallel to the region of the taper of the shaft in such a way that the leaf spring forms a spring-loaded inclined ramp for the outer rim of the plate-shaped objects.

4. Apparatus according to claim 1, characterized in that the taper of the top end of the shaft is configured in the shape of a cone, such that the topmost plate-shaped object (CD) can be shifted with its outer rim in the horizontal direction over a predefined distance, with respect to the stack, that is required for grasping that object at its outer rim.

5. Apparatus according to claim 1, characterized in that the gripper mechanism is arranged alongside the stack magazine movably in the vertical and horizontal direction, and has vertically movable upper and lower gripper arms for grasping the projecting outer rim of the topmost plate-shaped object (CD).

6. Apparatus according to claim 1, further including a sensor mechanism for detecting that a topmost object (CD) of the stack has been lifted into a position for removal and is located in the upper end of the shaft.

7. Apparatus according to claim 1, characterized in that the lifting mechanism is arranged alongside the stack magazine, and includes two horizontally pivotable lifting means for surrounding at least two of the lowest plate-shaped objects (CDs) at the outer rim and at points on their outer periphery diametrically opposite one another to lift the stack of plate-shaped objects.

8. Apparatus according to claim 7, characterized in that the lifting means includes clamping jaws, with gripping surfaces that are made of an elastic material and have V-shaped depressions and/or a lamellar structure on the gripping surfaces to receive the outer rim of the objects.

9. Apparatus according to claim 8, characterized in that the lowest objects (CDs) grasped by the lifting means of the lifting mechanism when in a removal position at the upper end of the shaft, be displaced in the horizontal direction by means of the displacement means between the clamping jaws.

10. Apparatus according to claim 9, characterized in that the clamping jaws are arranged on the lifting means so as to permit displacement horizontally in the direction of the gripper mechanism against a spring force of a spring means.

11. Apparatus according to one of claim 1, characterized in that the stack magazine is arranged replaceably.

12. Apparatus according to claim 1, characterized in that the plate-shaped object (CD) is configured as an information medium in the form of a compact disk or floppy disk.

* * * * *